March 2, 1954
E. BURSTEIN
2,671,154
INFRARED DETECTOR
Filed April 2, 1952
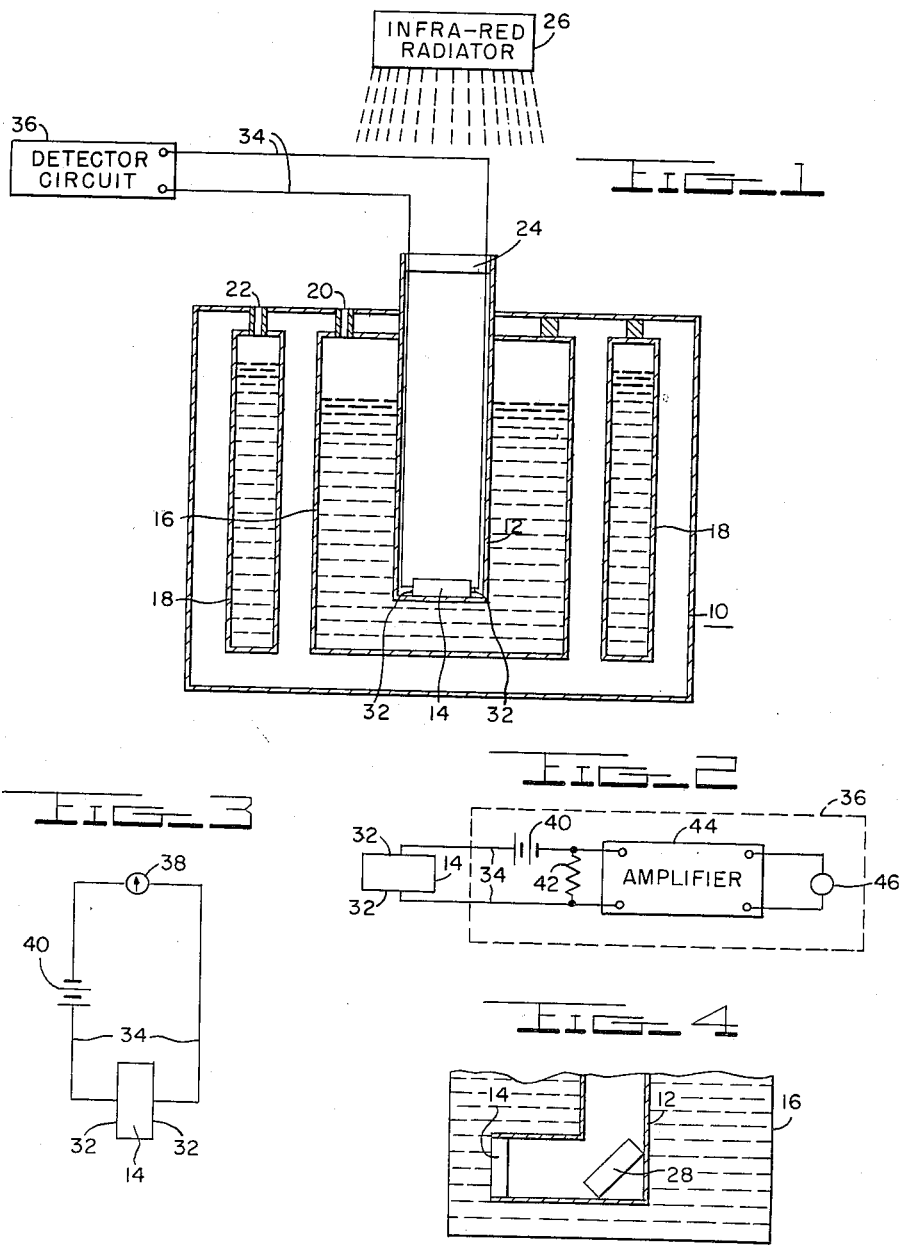
INVENTOR
ELIAS BURSTEIN Patented Mar. 2, 1954

2,671,154

UNITED STATES PATENT OFFICE 2,671,154

INFRARED DETECTOR

Elias Burstein, Washington, D. C.

Application April 2, 1952, Serial No. 280,154

10 Claims. (Cl. 201—63)

(Granted under Title 35, U. S. Code (1952), sec. 266)

This invention relates to infra-red detector apparatus and materials particularly suitable as photoconductors in the far infra-red spectrum.

Prior art far infra-red photoconductive detectors utilizing heteropolar substances such as PbS, PbTe, and PbSe, have been limited in their spectral response to a maximum wavelength of 6 microns. The study of low intensity radiation in the far infra-red beyond the former limits could not be undertaken utilizing substances conventionally associated with prior art devices.

Accordingly, it is an object of this invention to provide an infra-red photoconductive detector having a short time constant and a low equivalent noise input in the infra-red band beyond 6 microns to about 125 microns.

It is another object of this invention to provide homopolar materials doped with appropriate impurities capable of being used as photoconductors in the far infra-red portion of the spectrum.

Still another object of the present invention is to provide a far infra-red radiation detector utilizing the photoconductive properties of impure semi-conductors.

These and other objects of the present invention will become apparent upon consideration of the following detailed description in connection with the accompanying drawing which illustrates certain embodiments of the present invention. It is to be expressly understood, however, that the drawing is designed for purposes of illustration only and not as a definition of the limits of the invention, reference to the latter being had in the appended claims.

In the accompanying drawing,

Figure 1 represents a schematic drawing of an embodiment of a detector cell used in my present invention, Figure 2 represents a partial schematic drawing of a typical circuit to be used with my present invention, Figure 3 represents a schematic and block diagram of another typical circuit to be used with my invention, Figure 4 is a cross-sectional view of a portion of another embodiment of a detector cell according to my present invention.

My invention comprises a far infra-red radiation detector utilizing a homopolar compound such as silicon or germanium to which impurities in the form of donor atoms such as phosphorus, nitrogen, arsenic and antimony, or of acceptor atoms, such as boron, aluminum, indium and gallium, may be added. The homopolar substance used and the amount of impurities added determine the wavelength range to be detected. The temperature at which the detector is kept and the amount of impurities added determine its sensitivity. Far infra-red radiation impinging upon the doped homopolar substance which is kept at liquid helium temperature causes photoconductivity to take place in a body of this substance. An external circuit is coupled to the homopolar substance to measure its change in conductivity produced by the infra-red radiation. This change in conductivity of the substance causes a change in the current flow in the external circuit, which change is amplified and detected. Provision may be made to filter out all the radiation other than the infra-red band that is desired to be detected so that the photocurrent detected is definitely correlated solely with radiation in the infra-red band selected. Provision may be made either to chop the incoming radiation or to use scanning techniques to obtain radiation intensity variations at various frequencies to facilitate amplification and detection of small photocurrents. For more intense radiations producing larger photocurrents, a D. C. circuit may be utilized.

With special reference to the drawing, Figure 1 represents a typical embodiment showing the operation of my far infra-red detector.

In this figure, a detector containing unit 10 comprises an inner container 12 made of glass, plastic or low conductivity metal. This container holds a body 14 of photoconductive material. This inner container is held within a double Dewar including a long inner Dewar 16 containing liquid helium and an outer Dewar 18 containing liquid nitrogen. The walls of the Dewars should be of glass or of a metal having low heat conductivity, such as stainless steel, covered with highly polished copper plated surfaces and supported by the outer frame 10 by supports of metal having low heat conductivity, for example, inconel, an alloy containing 80% Ni, 5% Fe and 15% Cr. One of these supports 20 is pipe-shaped to act as an inlet for the liquid helium. Another support 22 for the outer Dewar acts as an inlet for the liquid nitrogen. The inner container is thus exposed to the liquid helium temperature of the inner Dewar 16, thereby maintaining sensitive body 14 substantially at liquid helium temperature. The inner container 12 is filled with helium gas to exclude air and water vapor which may otherwise condense on the sample and possibly absorb and scatter incoming radiation, and also to provide better heat transfer to the sample. A window 24 is provided at the outer end of the inner container 12. The window is of a material that transmits infra-red radiation from an infra-red radiator indicated at 26 in the radiation band that is being detected. For example, NaCl is suitable up to about 17 microns, KBr may be used to transmit up to 30 micron wavelengths, KRS-5, which is a mixture of thallium bromide and thallium iodide, may be used when radiation up to 40 microns is detected, and quartz (SiO$_2$) is used for wavelengths beyond 40 microns. The sensitive body 14 is placed in the direct optical path formed by the radiator 26, the window 24 and the inner container 12. Transmission filters may be inserted along the optical axis if desired. Body 14 is preferably shaped like a rectangular section having a thickness inversely proportional to the coefficient of optical absorption of the material, and has one surface substantially normal to the path of the incoming radiation. For example, a silicon specimen containing about $10^{15}$ impurity atoms per cubic centimeter and having a length of 1 centimeter and width and thickness of 5 millimeters produces excellent results.

The photoconductive body is composed of a homopolar material which includes anywhere from about $10^{12}$ to about $10^{18}$ donor or acceptor impurity atoms per cm.$^3$. These impurity atoms may comprise acceptor atoms such as boron, or donor atoms such as phosphorous. Specifically, if body 14 is composed of silicon, it may contain boron impurities in the range of $10^{14}$ to about $10^{18}$ atoms per cubic centimeter or phosphorous impurities in the range of $10^{14}$ to about $10^{18}$ atoms per cm.$^3$. If body 14 is germanium, impurities of antimony or arsenic in the range of about $10^{12}$ to about $10^{15}$ atoms per cm.$^3$ may be added.

The addition of donor impurities in the ranges of concentrations cited causes the formation of an impurity energy level separated from the conduction energy band of the pure elements, silicon or germanium, by an amount within the range of about 0.01 electron volt to about 0.08 electron volt, depending upon the amount of impurities added, whereas the addition of acceptor impurities in the concentrations cited causes the formation of an impurity energy level separated from the filled energy band of the pure elements by substantially the same range of differences. The amount of separation of the impurity energy levels formed from the filled energy and conduction bands of the pure states decreases with an increase of impurities added. These values compare with the energy separations between the filled bands and the conduction bands of 1.12 electron volts for pure silicon and 0.76 electron volt for pure germanium.

Two parallel faces of the sensitive body are electroded, preferably with rhodium electrodes 32, which may be electroplated on the sensitive material. Leads 34 couple these electrodes to a suitable detector circuit 36, which provides a means for measuring the photocurrent developed as a result of the radiation impinging upon the body 14.

Provision may be made to provide light choppers with opaque or selectively transmitting blades or some other optical means in order to cause a modulated radiation signal to be incident upon the photoconductor, and thereby provide a varying photocurrent that can be amplified by an A. C. system and detected independently of the steady thermal background radiation due to the window. Lenses and reflectors may also be provided to focus the radiation onto the photoconductor 14.

An example of a circuit available for use with the photoconductive material is shown in Figure 2. A potential is applied across the photoconductive body 14 by means of leads 34 coupling a source of D. C. voltage 40 to the electrodes 32. A load resistor 42 is contained in the circuit comprising the D. C. voltage source and the specimen. An amplifier 44 is connected across load resistor 42 to amplify the change in signal produced in the circuit due to a change in the conductivity of body 14 in response to a change in the amount of infra-red radiation impinging on it. A detector 46 is provided for detecting the output from amplifier 44.

For detecting higher intensity radiation sources, a simple D. C. circuit such as exemplified in Figure 3 may be employed. A D. C. voltage source 40 is applied across the electrodes 32 electroded on photoconductor 14. A D. C. current indicator 38 provides an indication of the photocurrent produced due to radiation impinging on the photoconductor 14.

Typical values for a silicon specimen containing $3 \times 10^{15}$ unionized donor atoms per cm.$^3$ at liquid helium temperature are: $3 \times 10^7$ ohms dark resistance in the presence of background radiation alone, load impedance in the form of a resistance or tuned L–C impedance of $3 \times 10^7$ ohms and a voltage supply rang of about 180–360 volts.

In Figure 4, an alternate embodiment is shown. In this embodiment, a selective reflection plate 28 of infra-red radiation reflective material may be provided to selectively reflect the desired wavelengths before the incoming radiation impinges upon body 14. While it is preferable to keep reflection plate 28 at liquid helium temperature to minimize the background noise, it is also feasible to provide radiation plates external to the detector cell. A less intense but purer radiation which is free from varying background radiation at other wavelengths results.

It must be understood that the use of liquid helium temperature is essential in order to achieve optimum results with both silicon and germanium specimens. It is only at these extremely low temperatures that much of the residual conductivity due to the impurities present in the body 14 is frozen out so that the photoconductivity effects are not masked by the inherent conductivity due to the presence of the free charge carrier impurities. This is true for all germanium specimens and for silicon specimens containing over $10^{17}$ impurity atoms per cm.$^3$. For purer silicon specimens, the optimum operating temperature is still that of liquid helium but the maximum temperature at which the specimen is operative increases as the specimen is purified to a maximum temperature somewhat above that of liquid hydrogen.

The maximum wavelength at which the homopolar substance used as the sensitive body 14 is sensitive increases with an increase in the concentration of impurity atoms up to the point where the residual photoconductivity becomes negligible as a result of increased impurity conductivity. Thus, for doped silicon specimens, the range extends to about 50 microns and for doped germanium specimens to approximately 125 microns.

It has been demonstrated that certain photoconductors which are intrinsic photoconductors in the infra-red region up to about one or two microns wavelength can be transformed into impurity photoconductors in the far infra-red by the addition of donor or acceptor impurity atoms within aforementioned limits and maintaining the impure substances so obtained at a temperature substantially equal to that of liquid helium.

In operation, the infra-red detector makes it possible to detect radiation emanating from bodies that are at different temperatures from their surroundings at high scanning speeds.

The invention described herein may be manufactured and used by or for the Government of the United States of America for governmental purposes without the payment of any royalties thereon or therefor.

What is claimed is:

1. In a device for detection of long wavelength infra-red radiation, the combination comprising a body of a homopolar substance containing impurities causing discrete energy levels between 0.01 and 0.08 electron volt removed from a fixed energy band found in the pure state, and means to maintain said body at a temperature substantially equal to absolute zero.

2. In a device for detection of long wavelength infra-red radiation, the combination comprising a body of a material from the group consisting of silicon and germanium containing impurity atoms of an element selected from groups III and V of the periodic table, the number of impurity atoms selected being such as to provide a discrete energy level between 0.01 and 0.08 electron volt removed from a given energy band of the body, and means to maintain said specimen at a temperature substantially equal to absolute zero.

3. In a device for the detection of long wavelength infra-red radiation, the combination comprising a specimen of silicon including impurity atoms of an element selected from groups III and V of the periodic table, the number of impurity atoms being such as to provide a discrete energy level between 0.01 and 0.08 electron volt removed from a given energy band of silicon, and means to maintain said specimen at a temperature substantially equal to absolute zero.

4. In a device for detection of long wavelength infra-red radiation, the combination comprising a specimen of silicon having an impurity between $10^{14}$ to $10^{18}$ atoms of boron per cubic centimeter, and means to maintain said specimen at a temperature substantially equal to absolute zero.

5. In a device for detection of long wavelength infra-red radiation, the combination comprising a specimen of silicon having an impurity between $10^{14}$ to $10^{18}$ atoms of phosphorous per cubic centimeter, and means to maintain said specimen at a temperature substantially equal to absolute zero.

6. A device for detection of far infra-red radiation comprising; a body of a homopolar substance containing impurities, said body being suitably electroplated on opposite ends to transpose a photoconductive current, an inner sealed chamber substantially enclosing said body, a window in said inner chamber to permit entrance of the infra-red radiation, a second chamber substantially enclosing said inner chamber containing a liquid or gas maintained at approximately absolute zero temperature, a third chamber substantially enclosing said second chamber containing liquid nitrogen or an equivalent cooling agent, and detecting means electrically connected to said electroplated ends of said homopolar body for detecting a photoconductive response to infra-red radiation impinging thereon.

7. A device for detection of far infra-red radiation comprising; a body of a homopolar substance containing impurities causing discrete energy levels between 0.01 and 0.08 electron volt removed from a fixed band found in the pure state, said body being suitably electroplated on opposite ends to transpose a photoconductive current, a sealed inner chamber substantially enclosing said body containing a suitable gas to prevent condensation within the chamber, a window in said inner chamber transparent to infra-red radiation beyond 40 microns, a second chamber substantially enclosing said inner chamber containing a liquid maintained at approximately the temperature of liquid helium; a third chamber substantially enclosing said second chamber containing liquid nitrogen or an equivalent cooling agent and detecting means electrically connected to said electroplated ends of said homopolar body for detecting a photoconductive response to infra-red radiation impinging thereon.

8. A device for detection of far infra-red radiation comprising; a body of a homopolar substance containing impurities causing discrete energy levels between 0.01 and 0.08 electron volt removed from a fixed band found in the pure state, said body being suitably electroplated on opposite ends to transpose a photoconductive current, a sealed inner chamber substantially enclosing said body, a window in said inner chamber to permit an optical path between the radiation source and said body, a reflector plate of a substance that selectively reflects radiation in the infra-red band disposed within said inner chamber and in said optical path, a second chamber substantially enclosing said inner chamber containing a liquid or gas maintained at approximately the temperature of liquid helium; a third chamber substantially enclosing said second chamber containing liquid nitrogen or an equivalent cooling agent, and detecting means electrically connected to said electroplated ends of said homopolar body for detecting a photoconductive response to infra-red radiation impinging thereon.

9. In a device for detection of far infra-red radiation, the combination comprising a specimen of germanium having an impurity between $10^{12}$ to $10^{15}$ atoms of antimony per cubic centimeter; and means to maintain said specimen at a temperature substantially equal to absolute zero.

10. In a device for detection of far infra-red radiation, the combination comprising a specimen of germanium having an impurity between $10^{12}$ to $10^{15}$ atoms of arsenic per cubic centimeter; and means to maintain said specimen at a temperature substantially equal to absolute zero.

ELIAS BURSTEIN.

References Cited in the file of this patent

UNITED STATES PATENTS

| Number | Name | Date |
| --- | --- | --- |
| 2,547,173 | Tittner | Apr. 3, 1951 |

OTHER REFERENCES

An Achromatic Doublet of Silicon and Germanium, by R. C. Treuting from Journal of the Optical Society of America, vol. 41, No. 7, July 1951, pages 454–456.